(12) United States Patent
Frazier et al.

(10) Patent No.: US 10,761,853 B2
(45) Date of Patent: *Sep. 1, 2020

(54) EXTENDING DATA RANGE ADDRESSING

(71) Applicant: INTERNATIONAL BUSINESS MACHINES CORPORATION, Armonk, NY (US)

(72) Inventors: Giles R. Frazier, Austin, TX (US); Michael K. Gschwind, Chappaqua, NY (US); Paul Mackerras, Weston (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 395 days.

This patent is subject to a terminal disclaimer.

(21) Appl. No.: 15/194,666

(22) Filed: Jun. 28, 2016

(65) Prior Publication Data

US 2017/0090932 A1 Mar. 30, 2017

Related U.S. Application Data

(63) Continuation of application No. 14/871,959, filed on Sep. 30, 2015.

(51) Int. Cl.
*G06F 9/34* (2018.01)
*G06F 9/30* (2018.01)
*G06F 9/355* (2018.01)

(52) U.S. Cl.
CPC .......... *G06F 9/342* (2013.01); *G06F 9/30076* (2013.01); *G06F 9/30098* (2013.01);
(Continued)

(58) Field of Classification Search
CPC .. G06F 9/342; G06F 9/30076; G06F 9/30098; G06F 9/30145
See application file for complete search history.

(56) References Cited

U.S. PATENT DOCUMENTS

| 5,303,358 A | 4/1994 | Baum |
| 5,491,808 A | 2/1996 | Geist, Jr. |

(Continued)

FOREIGN PATENT DOCUMENTS

| EP | 1351135 B1 | 12/2010 |
| GB | 2486905 A | 4/2012 |

OTHER PUBLICATIONS

Office Action for U.S. Appl. No. 14/871,985 dated Oct. 5, 2016, pp. 1-26.

(Continued)

*Primary Examiner* — Michael J Metzger
(74) *Attorney, Agent, or Firm* — Steven Chiu, Esq.; Kevin P. Radigan, Esq.; Heslin Rothenberg Farley & Mesiti P.C.

(57) ABSTRACT

Addressability of instructions and the addressing of data ranges are extended. One or more operands obtained from fields explicitly specified by an instruction are overridden (i.e., ignored), and instead, an address based on the instruction (e.g., an instruction address) is substituted for the one or more operands. This provides an address having more bits than allowed by the operand being overridden, thereby extending addressability of the instruction and extended data range addressing. Further, in one aspect, additional bits may be added to one or more immediate fields of the instruction, thereby extending addressability of the instructions and extending data range addressing.

10 Claims, 18 Drawing Sheets

(52) U.S. Cl.
CPC ...... *G06F 9/30145* (2013.01); *G06F 9/30167* (2013.01); *G06F 9/30181* (2013.01); *G06F 9/30185* (2013.01); *G06F 9/30196* (2013.01); *G06F 9/3557* (2013.01)

(56) References Cited

U.S. PATENT DOCUMENTS

| | | | |
|---|---|---|---|
| 5,537,629 A | 7/1996 | Brown et al. | |
| 5,809,273 A | 9/1998 | Favor | |
| 5,822,559 A | 10/1998 | Narayan | |
| 5,867,701 A | 2/1999 | Brown et al. | |
| 5,944,841 A * | 8/1999 | Christie | G06F 11/3636 714/38.11 |
| 6,014,735 A | 1/2000 | Chennupaty et al. | |
| 6,058,464 A * | 5/2000 | Taylor | G06F 3/14 710/9 |
| 6,167,505 A * | 12/2000 | Kubota | G06F 9/30149 712/210 |
| 6,240,506 B1 * | 5/2001 | Miller | G06F 9/30152 712/205 |
| 6,260,134 B1 | 7/2001 | Zuraski, Jr. et al. | |
| 6,275,927 B2 | 8/2001 | Roberts | |
| 6,336,178 B1 | 1/2002 | Favor | |
| 6,571,330 B1 * | 5/2003 | McGrath | G06F 9/30185 712/210 |
| 6,970,998 B1 * | 11/2005 | Favor | G06F 9/3016 712/212 |
| 7,181,596 B2 | 2/2007 | Henry et al. | |
| 7,487,338 B2 | 2/2009 | Matsuo | |
| 9,329,869 B2 | 5/2016 | Gschwind | |
| 2001/0013095 A1 | 8/2001 | Holmann | |
| 2003/0135789 A1 | 7/2003 | DeWitt | |
| 2003/0236965 A1 * | 12/2003 | Sheaffer | G06F 9/30076 712/209 |
| 2004/0186981 A1 * | 9/2004 | Christie | G06F 9/30036 712/210 |
| 2004/0250053 A1 * | 12/2004 | McGrath | G06F 9/30189 712/229 |
| 2005/0033940 A1 * | 2/2005 | McGrath | G06F 9/30101 712/209 |
| 2007/0260849 A1 | 11/2007 | Chen et al. | |
| 2008/0215856 A1 | 9/2008 | Gschwind | |
| 2008/0282066 A1 | 11/2008 | May | |
| 2009/0019257 A1 | 1/2009 | Shen | |
| 2010/0064119 A1 * | 3/2010 | Arakawa | G06F 9/30043 712/208 |
| 2010/0332803 A1 | 12/2010 | Yoshida et al. | |
| 2011/0035745 A1 | 2/2011 | Li et al. | |
| 2012/0331273 A1 | 12/2012 | Smith et al. | |
| 2013/0086363 A1 * | 4/2013 | Gschwind | G06F 9/3836 712/220 |
| 2013/0275723 A1 | 10/2013 | Combs | |
| 2014/0095833 A1 | 4/2014 | Gschwind et al. | |
| 2014/0164741 A1 | 6/2014 | Gschwind et al. | |
| 2015/0347144 A1 * | 12/2015 | Whittaker | G06F 9/30149 712/208 |
| 2016/0347144 A1 | 12/2016 | Whittaker | |
| 2017/0090923 A1 | 3/2017 | Gschwind | |
| 2017/0090931 A1 | 3/2017 | Frazier et al. | |
| 2017/0090939 A1 | 3/2017 | Gschwind | |
| 2017/0090940 A1 | 3/2017 | Gschwind | |
| 2017/0091064 A1 | 3/2017 | Gschwind | |
| 2017/0091065 A1 | 3/2017 | Gschwind | |
| 2018/0113784 A1 | 4/2018 | Gschwind | |
| 2018/0113785 A1 | 4/2018 | Gschwind | |

OTHER PUBLICATIONS

Final Office Action for U.S. Appl. No. 14/871,985 dated May 3, 2017, pp. 1-24.

Office Action for U.S. Appl. No. 14/871,959 dated Jun. 1, 2017, pp. 1-32.

Office Action for U.S. Appl. No. 14/871,979 dated Aug. 30, 2017, pp. 1-15.

Mel, Peter and Tim Grance, "The NIST Definition of Cloud Computing," National Institute of Standards and Technology, Information Technology Laboratory, Special Publication 800-145, Sep. 2011, pp. 1-7.

"z/Architecture Principles of Operation," IBM® Publication No. SA22-7832-10, Eleventh Edition, Mar. 2015, pp. 1-1732.

"Power ISA™ Version 2.07B," International Business Machines Corporation, Apr. 9, 2015, pp. 1-1527.

"Intel® 64 and IA-32 Architectures Developer's Manual: vol. 2A, Instructions Set Reference, A-L," Order No. 253666-045US, Jan. 2013, pp. 1-524.

"Intel® 64 and IA-32 Architectures Developer's Manual: vol. 2B, Instructions Set Reference, M-Z," Order No. 253667-045US, Jan. 2013, pp. 1-550.

Binder, Walter et al., "Advanced Java Bytecode Instrumentation," Proceedings of the 5th International Symposium on Principles and Practice of Programming in Java, Sep. 2007, pp. 135-144.

Gschwind, Michael K., "Exception Handling for Applications with Prefix Instruction," U.S. Appl. No. 14/941,575, filed Nov. 14, 2015, pp. 1-51.

Gschwind, Michael K., "Exception Handling for Applications with Prefix Instruction," U.S. Appl. No. 14/871,970, filed Sep. 30, 3015, pp. 1-56.

Gschwind, Michael K., "Managing the Capture of Information in Applications with Prefix Instructions," U.S. Appl. No. 14/871,979, filed Sep. 30, 2015, pp. 1-51.

Gschwind, Michael K., "Debugging of Prefixed Code," U.S. Appl. No. 14/871,985, filed Sep. 30, 2015, pp. 1-55.

List of IBM Patents or Patent Applications Treated as Related dated Mar. 16, 2016, pp. 1-2.

Frazier, Giles R. et al., "Extending Data Range Addressing," U.S. Appl. No. 14/871,959, filed Sep. 30, 2015, pp. 1-62.

List of IBM Patents or Patent Applications Treated as Related, Jul. 15, 2016, pp. 1-2.

Office Action for U.S. Appl. No. 14/871,970 dated Aug. 9, 2017, pp. 1-24.

Gschwind, Michael K., "Debugging of Prefixed Code," U.S. Appl. No. 15/195,800, filed Jun. 28, 2016, pp. 1-52.

List of IBM Patents or Patent Applications Treated as Related Oct. 24, 2016, pp. 1-2.

List of IBM Patents or Patent Applications Treated as Related dated Sep. 26, 2018, pp. 1-2.

* cited by examiner

EXTENDING DATA RANGE ADDRESSING

This application is a continuation of co-pending U.S. Ser. No. 14/871,959, entitled "EXTENDING DATA RANGE ADDRESSING," filed Sep. 30, 2015, which is hereby incorporated herein by reference in its entirety.

BACKGROUND

One or more aspects relate, in general, to processing within a computing environment, and in particular, to extending data range addressing within the computing environment.

Different computer system architectures offer data addressing with different displacements providing varying sizes of directly addressable data ranges. For instance, the Power Architecture, offered by International Business Machines Corporation, Armonk, N.Y., provides data addressing with a 16-bit displacement providing a 64 KB (kilobyte) directly addressable data range, while the x86 architecture, offered by Intel Corporation, provides data addressing with a 32-bit displacement providing a 4 GB (gigabyte) directly addressable data range.

The size of the directly addressable data range impacts and limits software applications. For instance, the size of global data areas, such as a Global Offset Table or Table of Contents used by software applications to locate global variables, is limited by the size of the directly addressable data range. As an example, if 16 bits is the maximum size of an immediate offset from a base register, then the size of the directly usable global data area is limited to 64 KB.

Previously, attempts have been made to overcome this limitation. In one approach, a 16-bit offset is used and an overflow of the global data area (e.g., GOT) is handled as a linker correction step. For instance, when an instruction to access a GOT entry overflows the 16 bits, an access to the GOT with a load is replaced by a branch to a subroutine, where each load has one separate subroutine that has a hardcoded return to the place where the subroutine was invoked to improve flexibility and performance. However, even with software optimizations, this can be prohibitive and lead to penalties in excess of 10% of the overall runtime.

In a further approach, a compiler generates a two instruction sequence for all accesses to handle the overflow. As an example, the load (ld) instruction of the following code fragment (where insn 0 and insn 1 represent arbitrary instructions preceding and following the ld instruction) may be replaced by a two instruction sequence.

```
insn 0
ld      r4, offset_of_a(r2)
insn 1
=>
```

In one example, the ld instruction is replaced by a two instruction sequence of addis and ld, where ld is a load instruction and addis is an add immediate instruction.

```
insn 0
addis   r4, r2, offset_of_a @ha     ;; high bits
ld      r4, offset_of_a(r4)         ;; low bits
insn 1
```

A two instruction sequence is generated by the compiler for all accesses, since the compiler does not know which GOT slots will be assigned by the linker outside of the 64 KB.

In yet a further approach, fusion is used, which enables the above sequence to be executed as three internal operations (iops), an example of which is:

```
insn 0                                              iop: insn 0
addis  r4, r2, offset_of_a @ha  ;; high bits \
ld     r4, offset_of_a@l(r4)    ;; low bits / -- fuse  iop: ld r4,
                                              to      offset_of_a(r2)
insn 1                                              iop: insn 1
```

However, this may not be used for various types of instructions, including float, vector and/or store instructions, as examples, where the result of addis in R4 is not to be overwritten by the second operation. Consequently, the first instruction computing an intermediate result may not be optimized away.

SUMMARY

In accordance with one or more aspects, enhanced addressability of a broad range of instructions is provided. Extended data ranges are provided minimizing limits on software applications.

Shortcomings of the prior art are overcome and additional advantages are provided through the provision of a computer-implemented method of facilitating processing in a computing environment. The computer-implemented method includes, for instance, obtaining, by a processor, an instruction to be executed, the instruction explicitly specifying one or more fields to be used to obtain an operand to be employed by the instruction; obtaining an indication that the operand is to be overridden; and based on obtaining the indication that the operand is to be overridden, replacing at least a portion of the operand with an address based on the instruction. The address overrides the operand, and is used to provide an extended address for use by the instruction. The extended address increases a range of addressing by the instruction. This enables the size of a directly addressable data range, such as a global data area, to be increased.

In a further embodiment, the extended address is further extended to provide additional addressability. The extending employs additional bits to extend the extended address. This allows the size of the directly addressable data range to be further increased.

As one example, the obtaining the indication is via another instruction. The other instruction is, in one embodiment, the same size as a size of the instruction, and it is to specify that the instruction is to ignore the operand. Further, the other instruction may specify the additional bits, via, for instance, one or more fields. Additionally, the other instruction may further include a specifier to indicate whether additional bits are specified. The other instruction provides, for instance, efficiencies in processing, by, e.g., being the same size. This reduces the complexity in decoding.

In a further aspect, the other instruction is decoded, and the decoding includes placing the indication and the additional bits in a register; and using the register to decode the instruction, the decoding including the replacing.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided to extend addressability of instructions, and therefore, addressing of directly addressable data ranges (referred to herein as an extend facility). In one aspect, one or more fields explicitly specified by an instruction and used to specify an operand or data to be used to obtain an operand are overridden (i.e., ignored). Instead, an address based on the instruction (e.g., a current instruction address, or an address adjusted for a prefix, etc.) is substituted for the one or more operands (or at least a portion thereof). By overriding such a field of an instruction, the operand is also overridden. This provides an address having more bits than allowed by the operand being overridden, thereby extending addressability of the instruction and extending data range addressing. Further, in one aspect, additional bits may be employed with (e.g., added to) one or more immediate fields of the instruction, thereby extending addressability of the instructions and extending data range addressing.

Figure 1A:
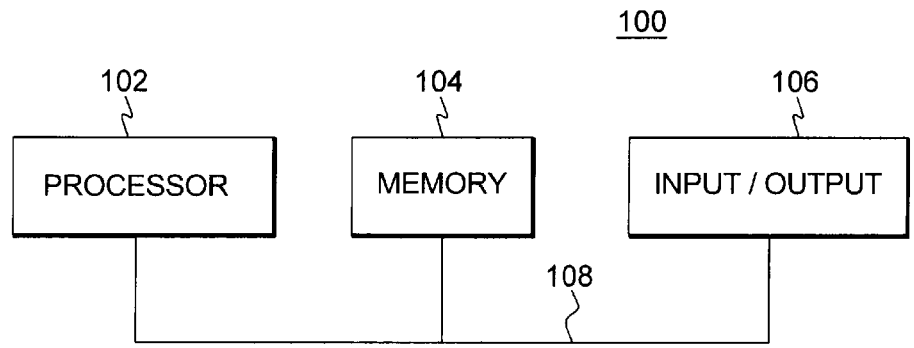
FIG. 1A depicts one example of a computing environment to incorporate and/or use one or more aspects of the present invention.

One embodiment of a computing environment to incorporate and use one or more aspects of an extend facility is described with reference to FIG. 1A. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-10, Eleventh Edition, March 2015, which is hereby incorporated by reference herein in its entirety. In one example, the processor executes an operating system, such as z/OS, also offered by International Business Machines Corporation. IBM®, Z/ARCHITECTURE® and Z/OS® (as well as Z/VM® referenced below) are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.07B," International Business Machines Corporation, Apr. 9, 2015, which is hereby incorporated by reference herein in its entirety. POWER ARCHITECTURE® is a registered trademark of International Business Machines Corporation, Armonk, N.Y.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated by reference herein in its entirety. Intel® is a registered trademark of Intel Corporation, Santa Clara, Calif.

Figure 1B:
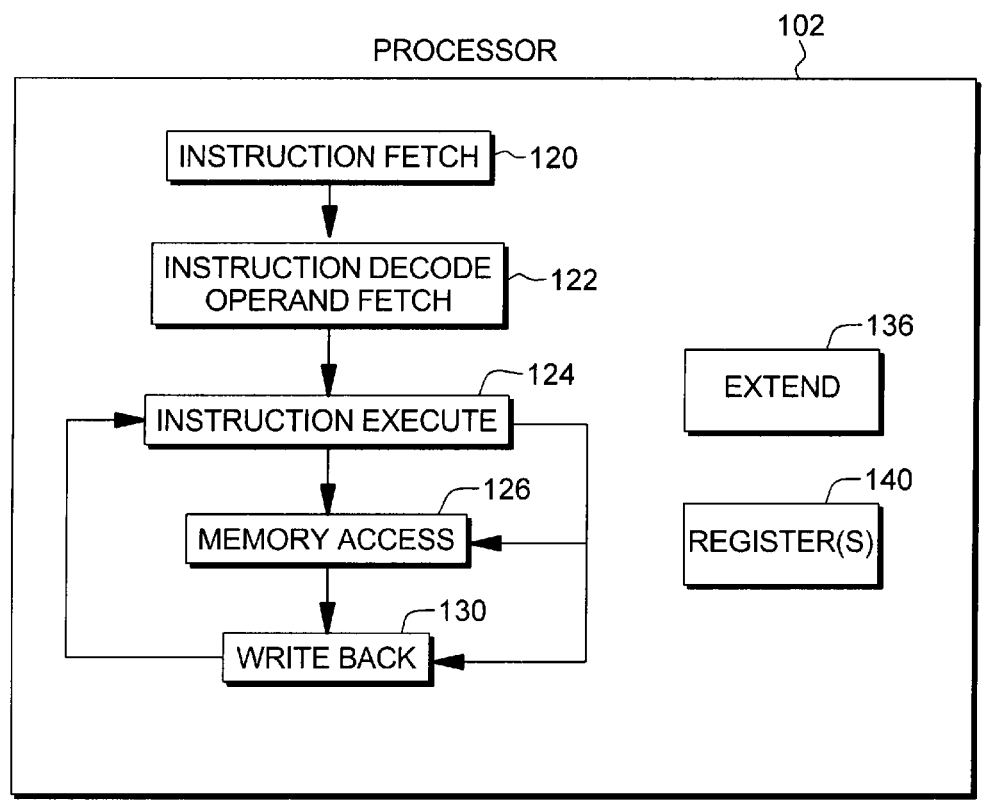
FIG. 1B depicts further details of a processor of the computing environment of FIG. 1A, in accordance with an aspect of the present invention.

Processor 102 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; an instruction execute component 124 to execute the decoded instructions; a memory access component 126 to access memory for instruction execution, if necessary; and a write back component 130 to provide the results of the executed instructions. One or more of these components may, in accordance with an aspect of the present invention, provide extend functionality by including at least a portion of or having access to an extend component 136. This functionality is described in further detail below.

Processor 102 also includes, in one embodiment, one or more registers 140 to be used by one or more of the functional components.

Figure 2:
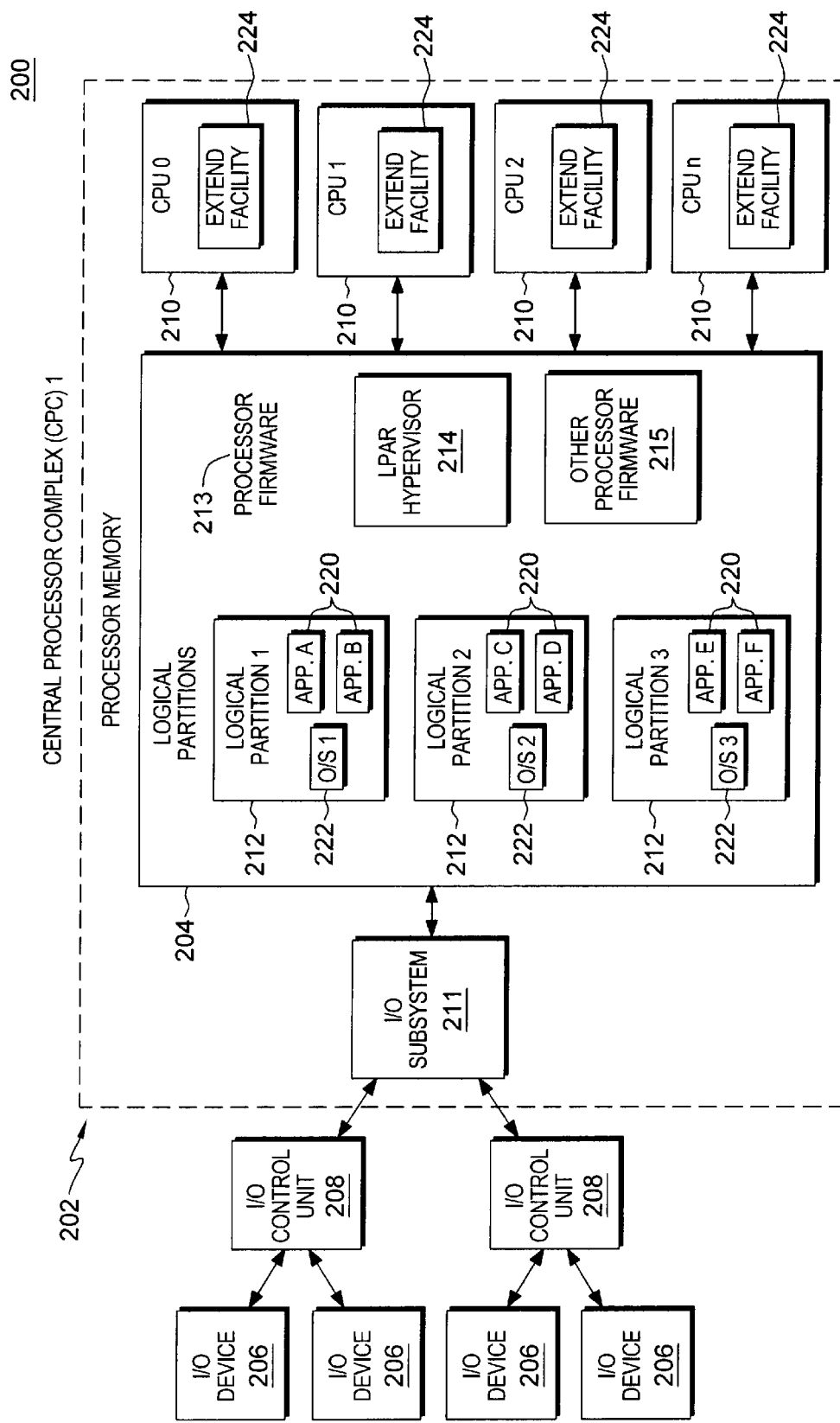
FIG. 2 depicts another embodiment of a computing environment to incorporate and/or use one or more aspects of the present invention.

Another embodiment of a computing environment to incorporate and use one or more aspects of the extend facility is described with reference to FIG. 2. In one example, a computing environment 200 is based on the z/Architecture, offered by International Business Machines (IBM®) Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/Linux operating system, or the TPF operating system, offered by International Business Machines Corporation, Armonk, N.Y. Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition. In one example, one or more of the CPUs include aspects of the extend facility 224 described herein.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
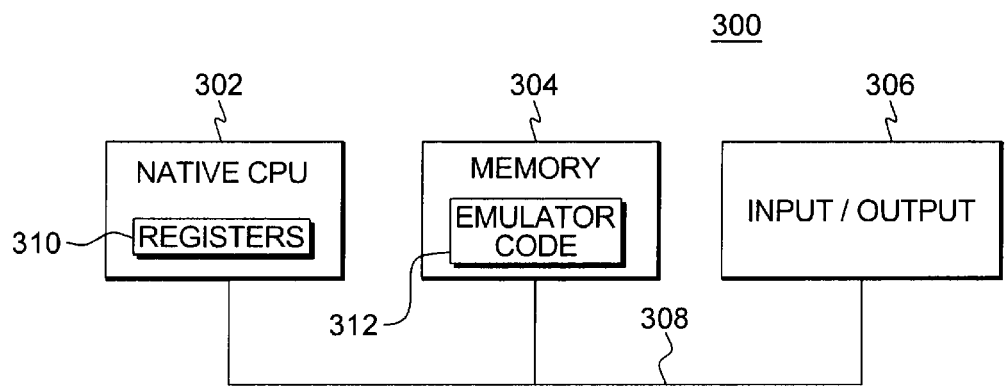
FIG. 3A depicts yet a further embodiment of a computing environment to incorporate and/or use one or more aspects of the present invention.

Another embodiment of a computing environment to incorporate and use one or more aspects of the extend facility is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 302 includes one or more native registers 310, such as one or more general purpose registers and/or one or more special purpose registers used during processing within the environment. These registers include information that represent the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, HP Superdome servers or others, to emulate the z/Architecture and to execute software and instructions developed based on the z/Architecture.

Figure 3B:
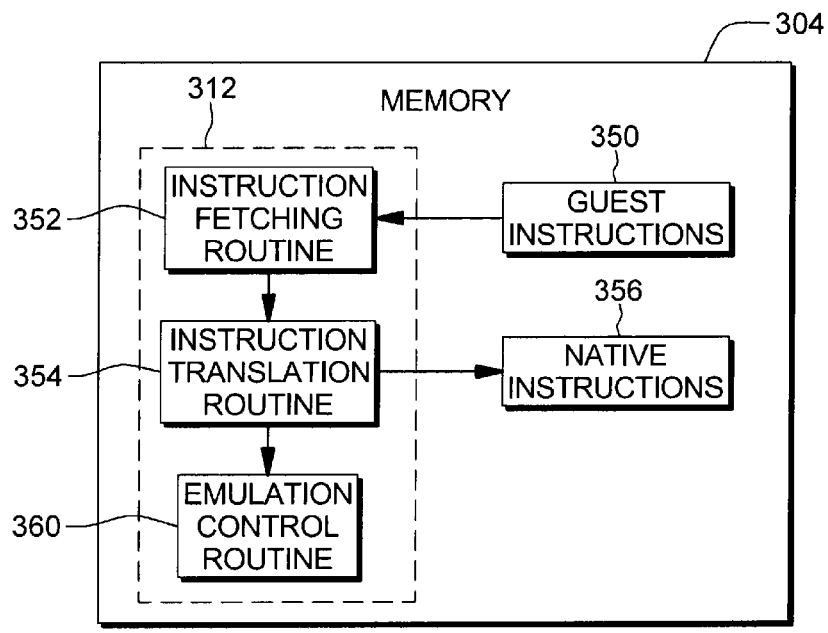
FIG. 3B depicts further details of the memory of the computing environment of FIG. 3A, in accordance with an aspect of the present invention.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each computing environment is capable of being configured to include one or more aspects of the present invention. For instance, each may be configured to extend addressability of an instruction by having one or more operands of the instruction overridden and/or have additional bits added to one or more operands of the instruction. By extending addressability of an instruction, extended data ranges are addressable.

Figure 4A:
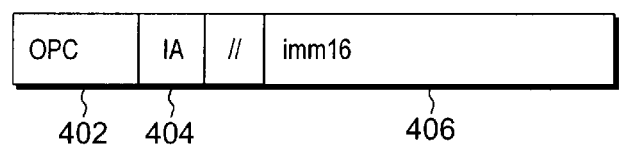
FIGS. 4A-4C depict various examples of a prefix instruction used in accordance with one or more aspects of the present invention.

In one embodiment, an indication to extend addressability of an instruction is provided via a prefix instruction. One example of such an instruction is described with reference to FIG. 4A. In one example, a prefix instruction 400A includes, for instance, an operation code (OPC) field 402 including an operation code that specifies a prefix instruction; an instruction address (IA) field 404 including an indicator indicating whether an address based on a successor instruction, such as the current instruction address (e.g., the program counter) of the successor instruction, is to be used as a base address for this successor instruction, thus overriding one or more operands of the successor instruction; and at least one immediate (imm16) field 406 including a value (e.g., 16 bits) that is to be employed with (e.g., added to) one or more operands of the successor instruction. The instruction address indicator and the value(s) are referred to herein as a prefix. The prefix is specified by the prefix instruction, as one example.

Figure 4B:
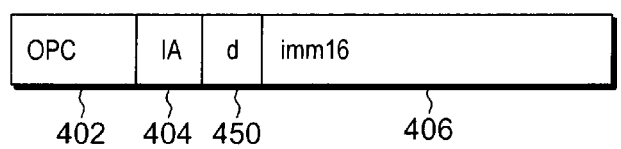
Figure 4C:
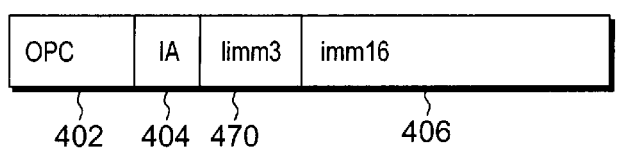

In a further embodiment, as shown in FIG. 4B, a prefix instruction 400B may include a displacement specifier field (d) 450 that indicates whether additional immediate bits are to be used.

In yet a further embodiment, a prefix instruction 400C includes a further immediate (limm3) field 470 including a value (e.g., 3 bits) which may be employed with (e.g., added to, OR'd with) low order bits of an immediate operand of the successor instruction, while the value in immediate field 406 may be employed with high order bits of an immediate operand. Additionally, limm3 may be used to override one or more bits of an immediate operand of the successor instruction. As examples, if an instruction has a DS immediate field (e.g., a Load Floating-Point Double Pair or a Store Floating-Point Double Pair instruction), then the operand of the field may be extended as follows: imm16||DS||limm3<1:2>; or in another example, imm16||DS<16:28>||limm3<0:2>. Many other possibilities exist. For instance, limm3 may be OR'd, e.g., (DS||0b00) OR limm3<0:2>. Again, other possibilities exist.

In one example, in operation of the prefix instruction (e.g., 400A, 400B, 400C), a special purpose register, referred to herein as SPRd, is updated to include values of the fields of the instruction. For instance, one field of the register (e.g., SPRd[val]) is set equal to the value in immediate field 406. Further, another field of the register (e.g., SPRd[IA]) is set equal to the instruction address indicator included in the prefix instruction (e.g., set to one to indicate that the current instruction address is to be used as a base address in the next instruction). In yet a further embodiment, another field of the register or an existing field (e.g., VAL) may include the value in immediate field 470. Other possibilities also exist. These values are then used in many types of instructions, including D-form instructions that include displacements, x-form instructions (i.e., index form instructions computing a memory address as the sum of two registers, e.g., RA+RB), etc.

Figure 5A:
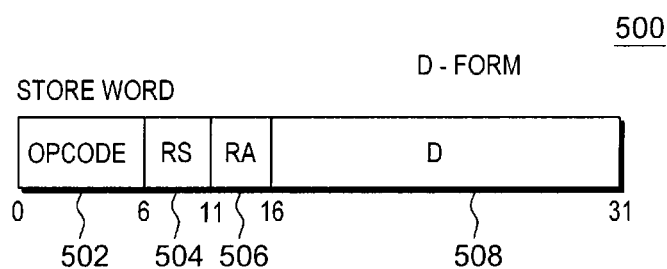
FIG. 5A depicts one example of a Store Word instruction, used in accordance with an aspect of the present invention.

As one particular example, the prefix instruction may be used to override and/or alter operands of a Store Word instruction, an example of which is depicted in FIG. 5A. As depicted in FIG. 5A, a Store Word instruction 500 includes an opcode field 502 having an operation code to specify a store word operation; and one or more operand fields including an RS field 504 that includes a register having a value to be stored; and an RA field 506 having a register that includes a value to be used to determine a storage address of a location in which to store the value of register RS. Instruction 500 further includes a displacement field 508 having data used in determining the storage address.

This instruction (referred to as the prefixed instruction) follows a prefix instruction, and in execution of the Store Word instruction, in one embodiment, if SPRd[IA]=a pre-defined value (e.g., 1), and optionally, RA=another pre-defined value (e.g., 0), then a variable (e.g., b) is set equal to the Store Word instruction address. Further, in one embodiment, additional bits are added to the value of the displacement field, a result of which is added to b. One example of pseudo-code for the Store Word instruction is as follows:

If (SPRd[IA]=1 && RA=0) then b=IA else
if RA=0 then b←0
else b←(RA)
EA←b+EXTS(SPRd[val]||D)
MEM(EA, 4)←(RS)$_{32:63}$
SPRd=0
Let the effective address (EA) be the sum of a base address specified by variable b and the sign extended concatenated value of the displacement field of the prefix instruction (e.g., captured in SPRd[val] in this example) and the displacement specified in the Store Word instruction. The base address variable b is initialized to the current instruction address, if, in one example, the IA prefix field is set in the prefix instruction to override the RA field, and if and only if the RA field specifies register 0. Otherwise, if the register value of 0 is specified in the RA field, the base address variable b is 0, and otherwise if a register number from 1 to 31 is specified, the base address b corresponds to the value stored in the specified register. $(RS)_{32:63}$ are stored into the word in storage addressed by EA. The prefix is cleared by resetting SPRd. Further, EXTS refers to extended sign and || refers to concatenation.

In a further embodiment, the value of RA is not checked. Thus, the pseudo-code is as follows:

If (SPRd[IA]=1) then b=IA else
if RA=0 then b←0
else b←(RA)
EA←b+EXTS(SPRd[val]||D)
MEM(EA, 4)←$(RS)_{32:63}$
SPRd=0

Let the effective address (EA) be the sum of b+d. The base address variable b is initialized to the current instruction address, if the IA prefix field is set in the prefix instruction in order to override the RA field, in one example. Otherwise, if the register value of 0 is specified in the RA field, the base address variable b is 0, and otherwise if a register number from 1 to 31 is specified, then the base address b corresponds to the value stored in the specified register. The displacement d is the sign extended concatenated value of the displacement bits specified by the prefix and the displacement bits specified by the store word instruction. $(RS)_{32:63}$ are stored into the word in storage addressed by EA. The prefix is cleared by resetting SPRd.

In one or more embodiments, the instruction address used to override the operand may be the current instruction address of the prefixed instruction, as indicated above, or it may be other addresses. As examples, it may be the address of the prefix, or the address of the prefix instruction. In yet another embodiment, it may be the address of the instruction following the prefixed instruction. Other addresses at a fixed positive or negative offset from the prefix, prefixed instruction, or the instruction following such instruction are also contemplated within the scope of aspects of the present invention. Many variations are possible.

Further, while the combination of portions of prefix provided and instruction provided displacements has been described as bits in one example hereinabove, the use of other combination functions are contemplated, such as the addition of shifted sign extended values, e.g., EXTS(SPRd[val])<<16+EXTS(d), the subtraction of values EXTS(SPRd[val])<<16−EXTS(d), the use of a bit-interleaving function EXTS(bit_interleave(SPRd[val], d)), or any other function adapted to combine two bit vectors, i.e., combine(SPRd[val],d). Many possibilities exist.

In yet another embodiment, a prefix instruction may be provided to specify additional addressing information, e.g., providing an index register to be included in conjunction with a base instruction specifying a base plus index addressing mode in order to enable the computation of addressing modes IA+RX+displacement in one embodiment. In one such embodiment, IA corresponds to an instruction address, RX to the contents of a specified index register and the displacement corresponds to at least the displacement of the base instruction, optionally further including additional displacement bits, when specified by a prefix in one embodiment. In another embodiment, a specified index, register Rx may be used to specify an index register to be used in conjunction with a non-overridden base address and a displacement, when used in conjunction with a base plus displacement address mode instruction to enable the computation of an addressing mode RA+RX+displacement when a base ISA (instruction set architecture) does not support such an addressing mode without the prefix. In one such embodiment, RA corresponds to the content of register RA (optionally forcing the value 0 when register, RA=0 is specified, in some embodiments), RX to the contents of a specified index register and the displacement corresponds to at least the displacement of the base instruction, optionally further including additional displacement bits, when specified by a prefix, in one embodiment.

The above instruction is of a reduced instruction set architecture (RISC). However, many other instructions may use one or more of the prefixing capabilities, described herein, including instructions in the RISC architecture, as well as instructions of other architectures, such as complex instruction set architectures (CISC). One such instruction is a Vector Load to Block Boundary instruction. An example of a format of this instruction is described with reference to FIG. 5B.

Figure 5B:
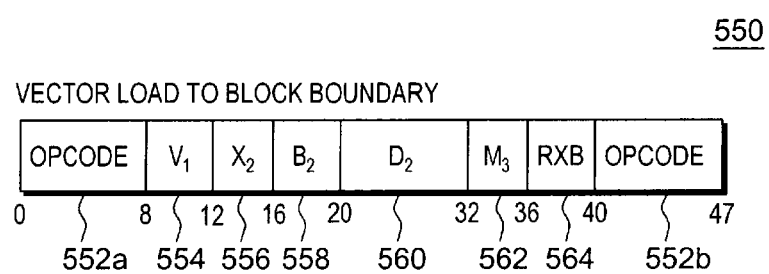
FIG. 5B depicts one embodiment of a Vector Load To Block Boundary instruction, used in accordance with an aspect of the present invention.

In FIG. 5B, a Vector Load to Block Boundary instruction 550 includes a plurality of fields including one or more opcode fields 552a, 552b that includes a value specifying a vector load to block boundary operation; a vector register field ($V_1$) 554 specifying a vector register to be used by the instruction; an index field ($X_2$) 556, a base field ($B_2$) 558 and a displacement field ($D_2$) 560 to provide an address of an operand in memory (e.g., the contents of the general registers specified by the $X_2$ and $B_2$ fields are added to the contents of the $D_2$ field to form an address of a second operand); a mask field ($M_3$) 562 used to provide the block boundary; and an RXB field 564 providing a possible extension for the vector register field. In accordance with one or more aspects of the present invention, the value in the register specified by $B_2$ is ignored, and instead, the IA of the prefix instruction is used. Other fields may similarly be altered by the prefix instruction.

In operation, the first operand (value in the register specified in $V_1$) is loaded starting at the zero indexed byte element with bytes from the second operand. If a boundary condition is encountered, the rest of the first operand is unpredictable in one embodiment or model dependent in another embodiment.

Access exceptions are not recognized for second operand locations beyond the specified boundary. If no boundary is encountered, all byte elements of the first operand are loaded with data from storage.

If an IA prefix is specified, the value of $B_2$ is ignored, and the current instruction address, i.e., the instruction address of the next instruction, or other address in accordance with the specification of an IA prefix is used in lieu of the value in the base register to form the address of the second operand. That is, $B_2$ and thus, the operand are overridden.

The displacement ($D_2$) for VLBB is treated as a 12-bit unsigned integer. If a displacement prefix is specified (e.g., imm16 and/or limm3), the displacement includes the combined prefix-specified displacement and instruction specified displacement. In one embodiment, this is true if a displacement selector is specified. In one embodiment, the displacement combination is a concatenation of bit strings. In another optimization to align with fusion, it corresponds to the combination of an immediate shifted and immediate displacement, e.g., hd<<16+sign_ext(ld). Other possibilities exist.

Again, many other types of instructions and/or many other instructions may be altered by the prefix instruction.

Figure 6:
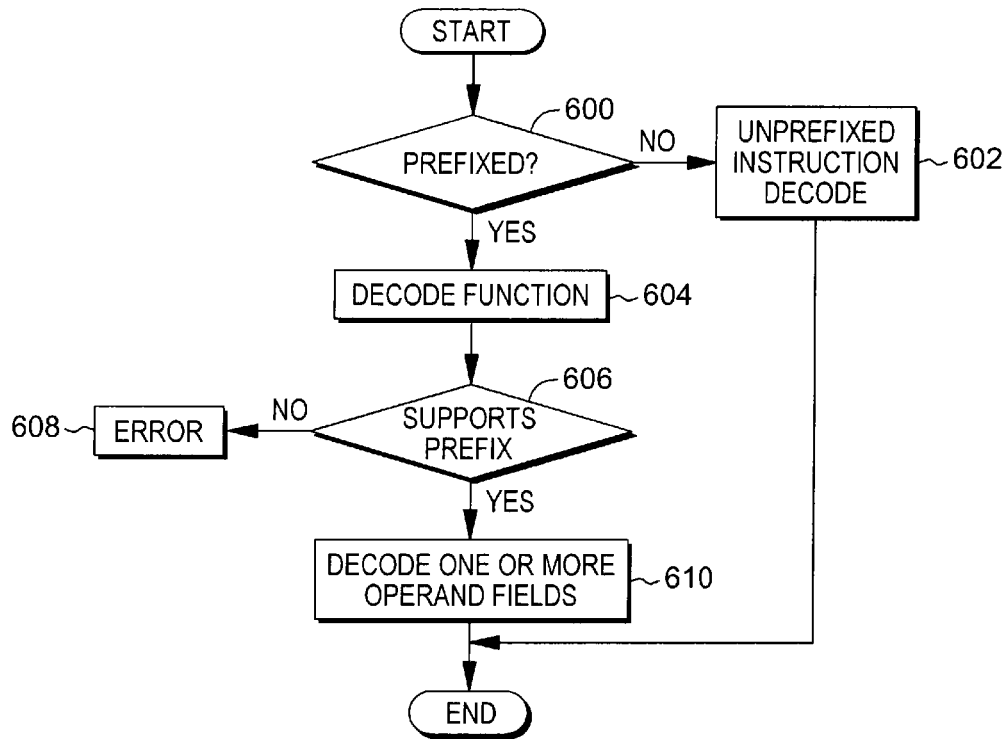
FIG. 6 depicts one embodiment of logic used to decode an instruction, in accordance with an aspect of the present invention.

One embodiment of logic to decode an instruction in accordance with an aspect of the present invention is described with reference to FIG. 6. In one example, this logic is performed by a decode unit of a processor. However, other units of the processor may process one or more aspects of the invention.

Initially, a determination is made as to whether the instruction has been prefixed, INQUIRY 600. That is, does the instruction have a prefix instruction associated or corresponding thereto (e.g., a prefix instruction provided immediately prior to this instruction or combined with this instruction). If not, then the instruction is decoded as previously known, STEP 602. However, if the instruction is prefixed, then a decode function is initiated, STEP 604, and optionally, a determination is made as to whether the decoding supports prefixing, INQUIRY 606. If not, then an error may be presented, STEP 608. However, if prefixing is supported, then one or more operand fields are decoded, STEP 610. The fields to be decoded depend on the operand fields of the particular instruction. For example, for the Store Word instruction in FIG. 5A, the RS, RA and D operand fields are decoded.

Figure 7:
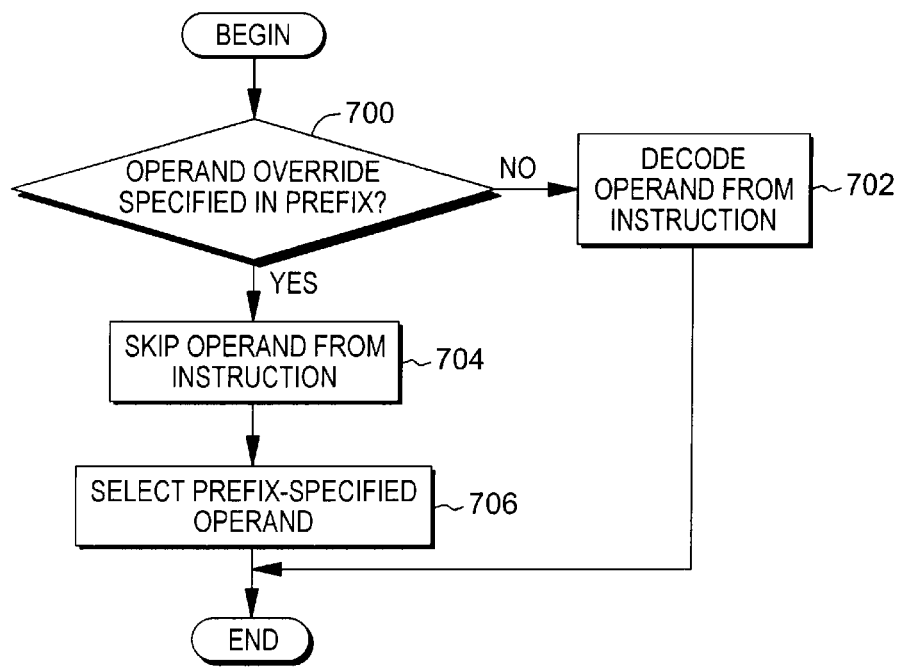
FIG. 7 depicts one embodiment of logic used to decode an overridden operand, in accordance with an aspect of the present invention.

Further details regarding the decoding of an operand, and in particular, an operand to be overridden, are described with reference to FIG. 7. In one embodiment, this logic is performed by a decode unit of the processor. Initially, a determination is made as to whether an operand override is specified in the prefix for the operand being decoded (e.g., the operand specified by RA in Store Word or by $B_2$ in Vector Load to Block Boundary), INQUIRY 700. That is, does the prefix instruction indicate that an instruction address is to be used to override the operand being decoded. If not, then the operand is decoded as in previous techniques, STEP 702. However, if there is an operand override specified for this operand, then the field used to specify the operand is ignored, STEP 704. Instead, an address based on the prefixed instruction (e.g., the current instruction address) is selected and used to decode the instruction and provide the operand value, STEP 706.

Figure 8A:
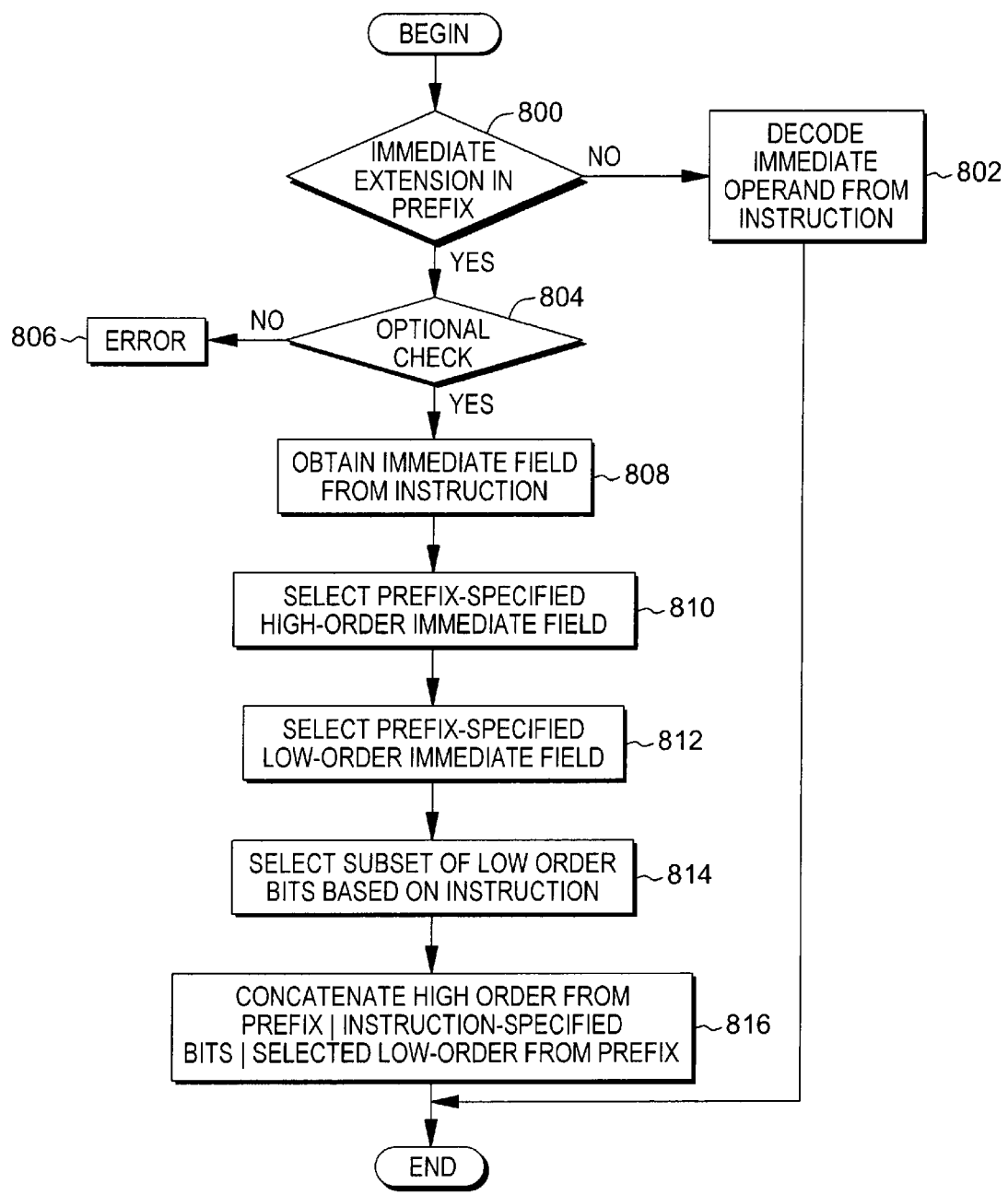
FIG. 8A depicts one embodiment of logic associated with decoding an immediate operand of an instruction, in accordance with an aspect of the present invention.

One embodiment of the logic for decoding immediate operands is described with reference to FIG. 8A. This logic is performed by a decode unit, as one example. Initially, a determination is made as to whether there is an extension provided in the prefix for the immediate operand being decoded, INQUIRY 800. If not, then the immediate operand is decoded as in previous techniques, STEP 802. However, if there is an immediate extension in the prefix for this operand, INQUIRY 800, then an optional check may be performed that determines whether the applying of the prefix is allowed for this particular instruction, INQUIRY 804. If prefixing is not allowed, then an error may be indicated, STEP 806. However, if prefixing is allowed, then the immediate field is obtained from the instruction (e.g., the D field in Store Word or the $D_2$ field in the Vector Load to Block Boundary), STEP 808. Further, a prefix-specified immediate field is selected. In one particular example, the prefix-specified immediate field comprises multiple fields, including a high-order immediate field (e.g., imm16) and a low-order immediate field (e.g., limm3). Thus, in this example, the prefix-specified high-order immediate field is selected, STEP 810, as well as the prefix-specified low-order immediate field, STEP 812. Further, in one embodiment, a subset of low order bits is selected based on the instruction, STEP 814. Thereafter, the high order bits from the prefix are concatenated with the instruction specified bits and the selected low order bits from the prefix to produce an address, STEP 816.

Figure 8B:
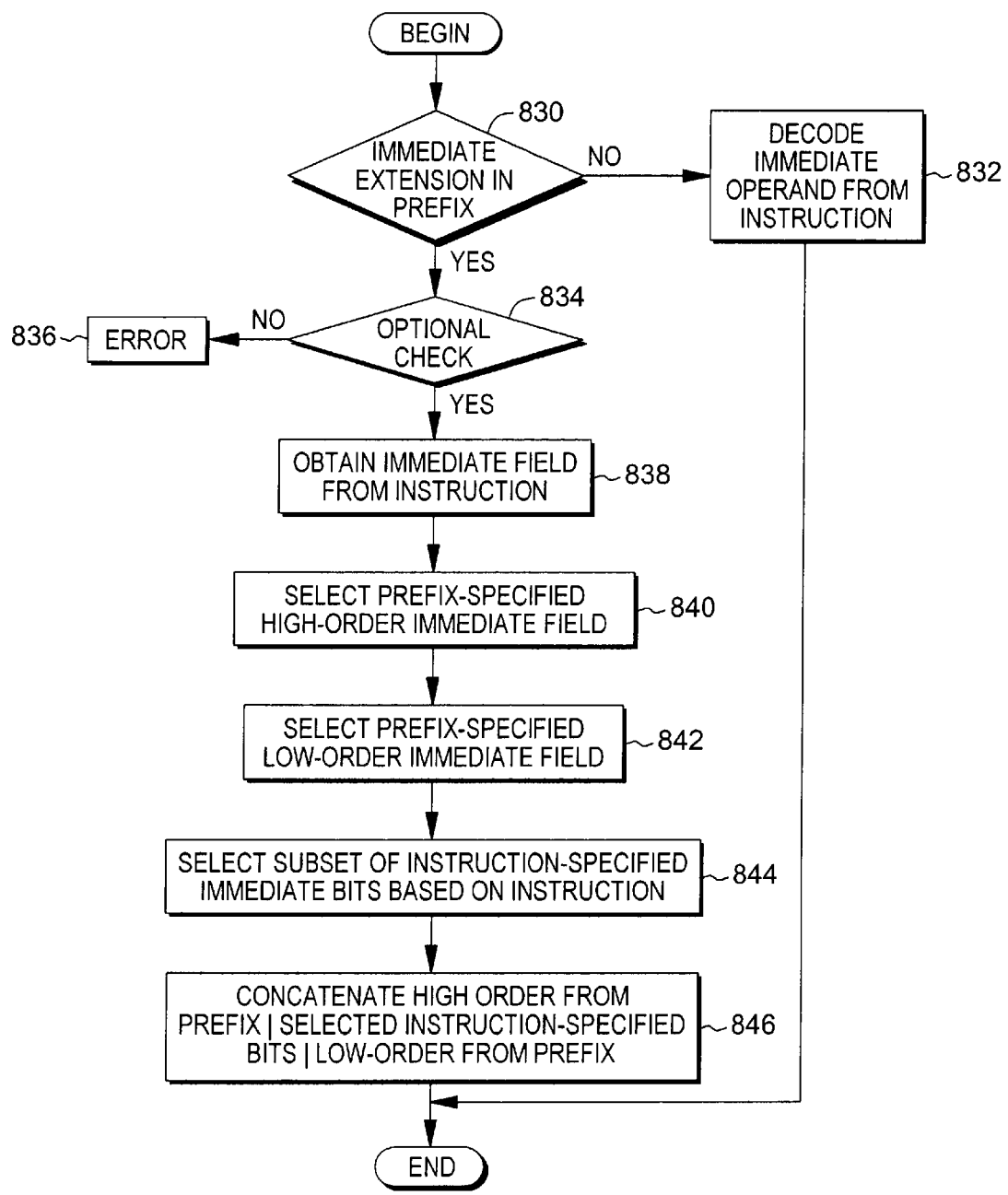
FIG. 8B depicts a further embodiment of logic used to decode an immediate operand of an instruction, in accordance with an aspect of the present invention.

An alternative embodiment of processing associated with decoding an immediate operand is described with reference to FIG. 8B. This logic is performed by a decode unit, in one example. Again, a determination is made as to whether an immediate extension is indicated in the prefix, INQUIRY 830. If not, then the immediate operand is decoded using previous techniques, STEP 832. However, if the immediate extension is indicated in the prefix, then an optional check may be performed to determine whether prefixing is allowed for this instruction, INQUIRY 834. If not, then an error may be indicated, STEP 836. Otherwise, the immediate field is obtained from the instruction (e.g., the D or $D_2$ field), STEP 838, as well as the extension from the prefix. For instance, in one embodiment, a prefix-specified high-order immediate field (e.g., imm16) is selected, STEP 840. Further, a prefix-specified low-order immediate field (e.g., limm3) may be selected, STEP 842. Additionally, a subset of instruction-specified immediate bits is selected based on the instruction, STEP 844. Then, the high-order bits from the prefix are concatenated with the selected instruction specified bits, which are concatenated with the low-order bits from the prefix, STEP 846.

Figure 8C:
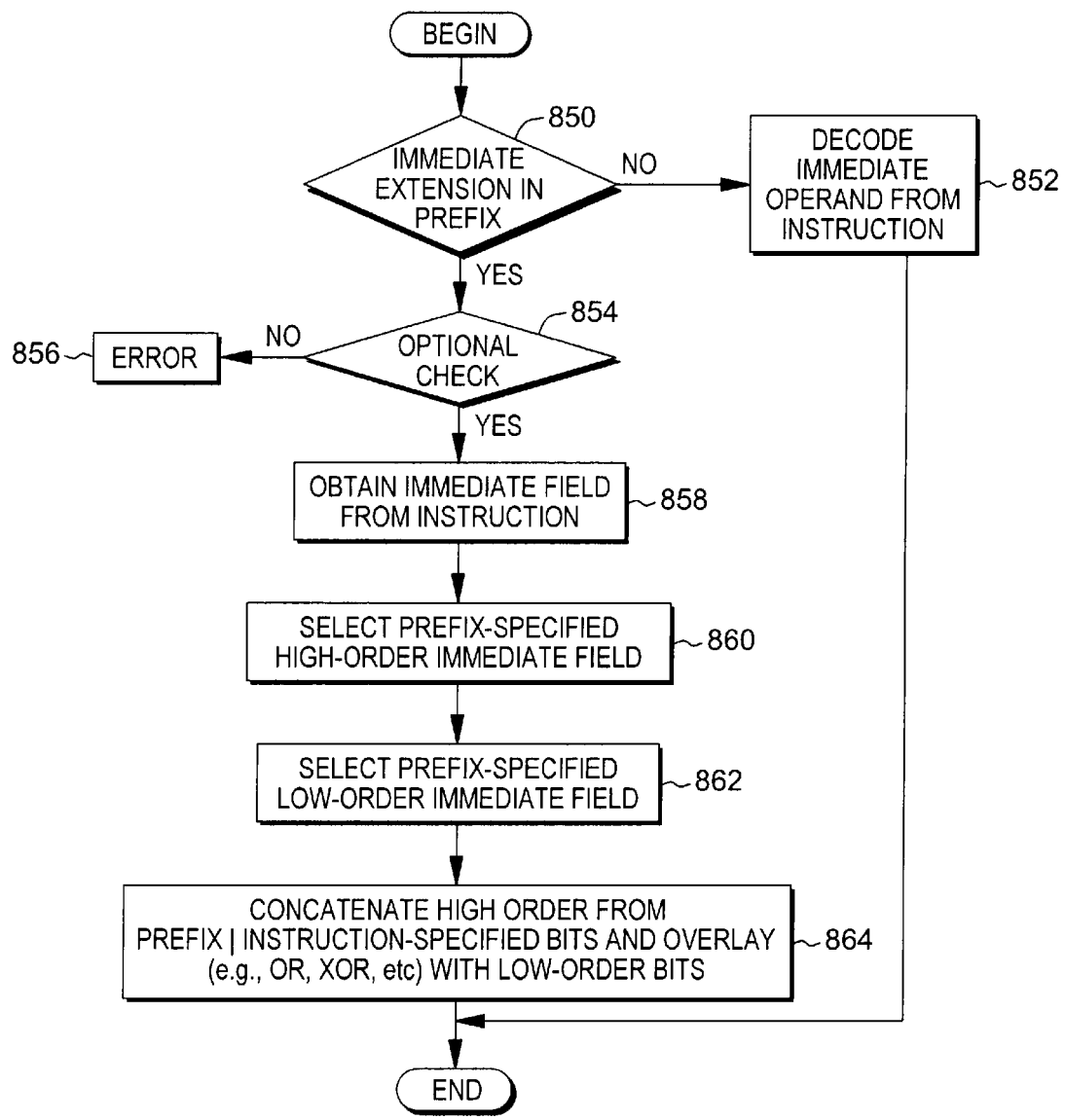
FIG. 8C depicts yet a further embodiment of logic used to decode an immediate operand of an instruction, in accordance with an aspect of the present invention.

A yet further embodiment for decoding the immediate operand is described with reference to FIG. 8C. This logic may be performed by a decode unit. Once again, a determination is made as to whether an immediate extension is indicated in the prefix, INQUIRY 850. If not, then the immediate operand is decoded as in previous techniques, STEP 852. However, if the immediate extension is specified, then an optional check may be performed to determine whether prefixing is allowed for this specific instruction, INQUIRY 854. If not, then an error may be indicated, STEP 856. Otherwise, in one embodiment, the immediate field (e.g., D or $D_2$) is obtained from the instruction, STEP 858. Further, the high-order immediate field (imm16) and the low-order immediate field (e.g., limm3) are selected from the prefix, STEPS 860 and 862. Then, the high-order bits of the prefix are concatenated with the instruction specified bits and overlaid (e.g., OR, XOR, etc.) with the low-order bits, STEP 864.

Although various examples are provided herein for decoding an immediate operand, other examples are possible. For instance, there may be one prefix-specified extension that is concatenated to all (or a subset) of the instruction specified immediate operand. Further, there may be multiple immediate operands, one or more of which are extended in one or more aspects. Yet further, other prefix-specified fields may be used and/or the values provided herein for the prefix-specified fields may be other than 16 and/or 3. Many other examples exist.

Figure 9:
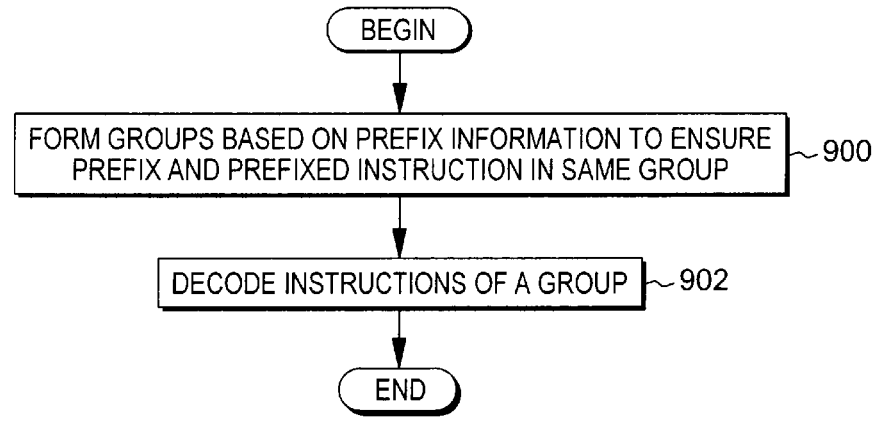
FIG. 9 depicts one embodiment of logic to form instruction groups, in accordance with an aspect of the present invention.

In a further implementation, instruction group formation may be used and may be based on prefixes. This is described further with reference to FIG. 9. One or more decode units may execute this logic. In one embodiment, a group having instructions to be decoded together is formed based on prefix information to ensure the prefix and the prefixed instruction are in the same group, STEP 900. Then, the instructions of a particular group are decoded, as described herein, STEP 902.

Figure 10:
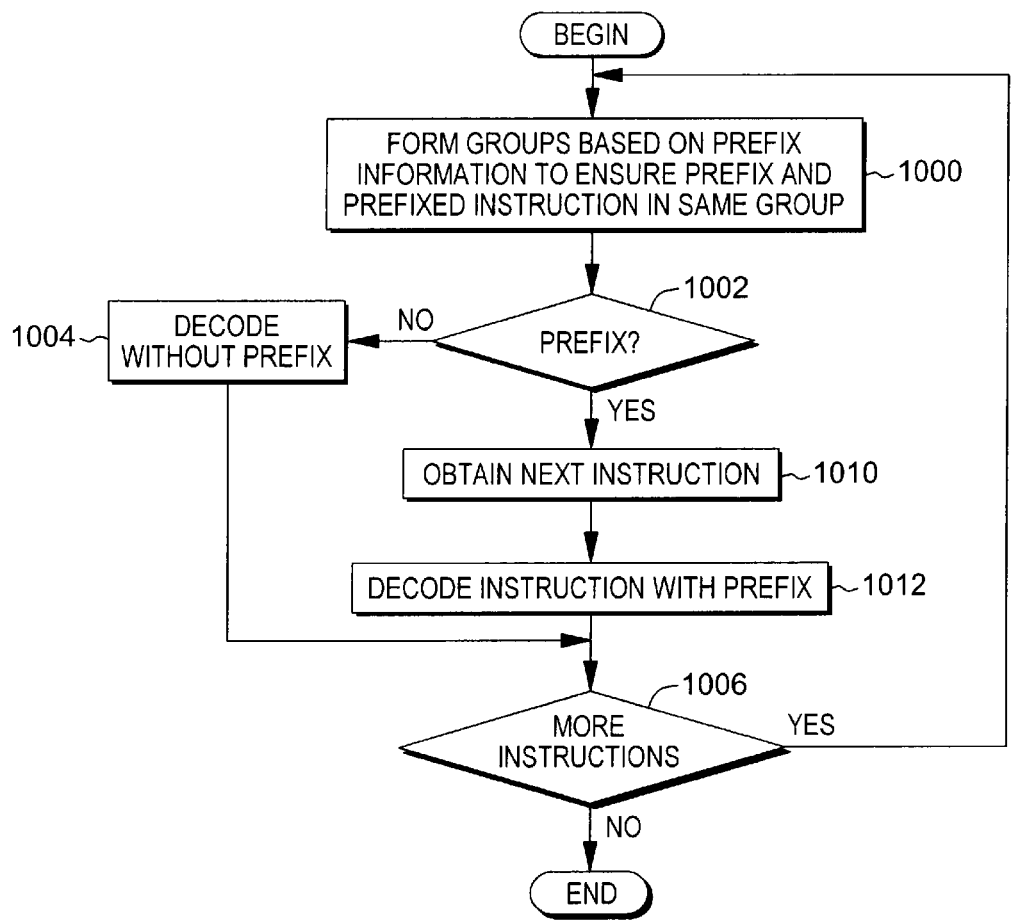
FIG. 10 depicts one example of logic used to decode instructions from a group, in accordance with an aspect of the present invention.

Further details of decoding instructions from a group are described with reference to FIG. 10. In one embodiment, groups are formed based on the prefix information to ensure the prefix and prefixed instruction are in the same group, STEP 1000. A determination is made as to whether there is a prefix in the group, INQUIRY 1002. If there is no prefix, then decoding is performed without a prefix as in current techniques, STEP 1004. Then, a determination is made as to whether there are more instructions to be processed, INQUIRY 1006. If there are no more instructions, then processing is complete. However, if there are more instructions, then processing continues to STEP 1000.

Returning to INQUIRY 1002, if a prefix is included within the group, then a next instruction (e.g., the successor prefixed instruction) is obtained, STEP 1010. The instruction is decoded with the prefix, STEP 1012, as described herein. Processing then continues to INQUIRY 1006.

Figure 11:
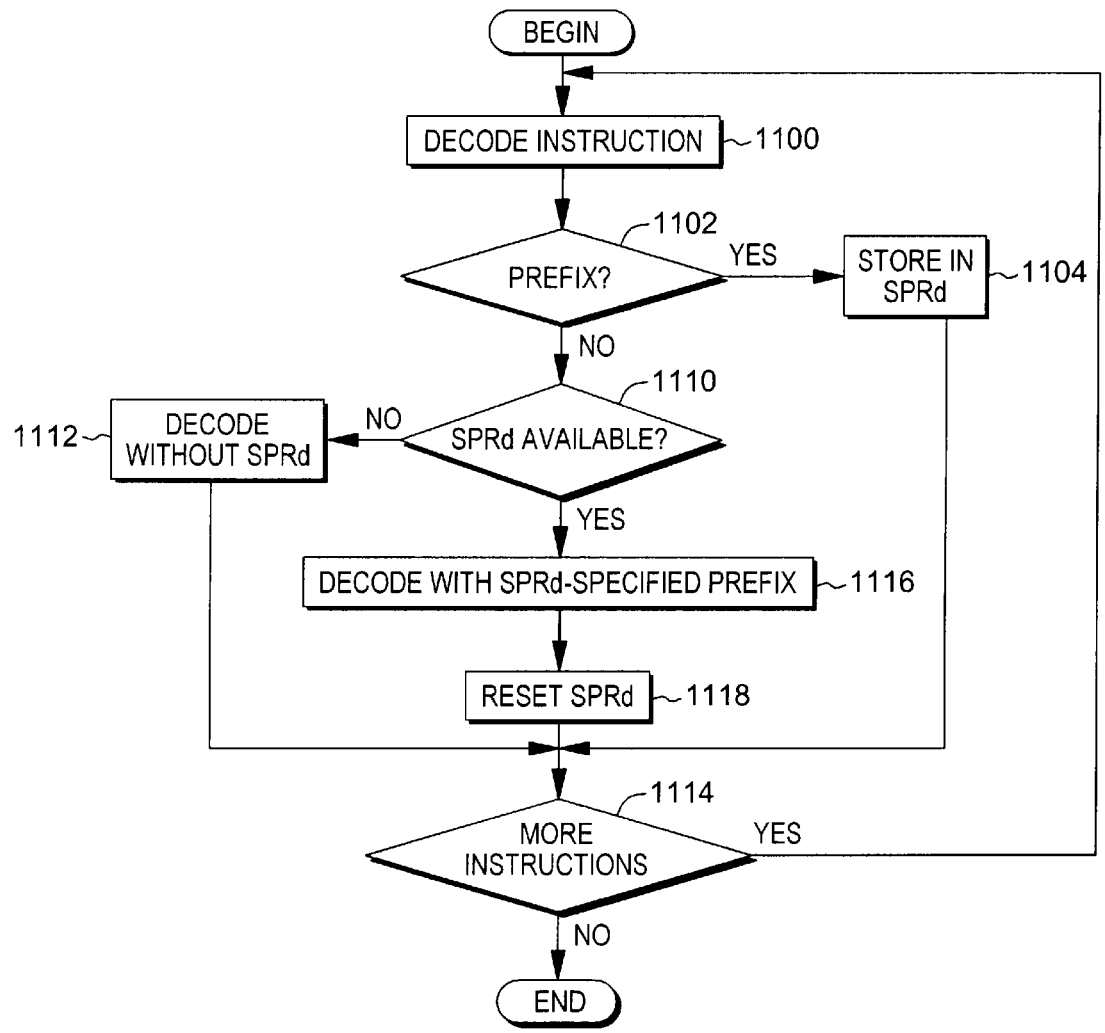
FIG. 11 depicts one embodiment of decoding an instruction using a special purpose register, in accordance with an aspect of the present invention.

One embodiment of decoding an instruction, including an instruction with a prefix, is described with reference to FIG. 11. Initially, an instruction is obtained to be decoded, STEP 1100. A determination is made as to whether this is a prefix instruction, INQUIRY 1102. If it is a prefix instruction, then one or more values of the prefix are stored in, for instance, a special purpose register, SPRd, STEP 1104. For instance, the instruction address indicator is stored in SPRd[IA], and imm16 is stored in SPRd[val], as examples. Thereafter, a determination is made as to whether there are additional instructions to be processed, INQUIRY 1114. If not, processing is complete. Otherwise, processing continues with STEP 1100. However, if this instruction is not a prefix instruction, then a determination is made as to whether a special purpose register (e.g., SPRd) is available for decoding the instruction, INQUIRY 1110. If a special purpose register is not available, then decoding is performed without the special purpose register, STEP 1112, and processing continues to INQUIRY 1114.

Returning to INQUIRY 1110, if a special purpose register is available, then decoding is performed with the specified prefix included in the special purpose register, STEP 1116. For instance, if an override prefix is specified, the instruction operand corresponding to that prefix is overridden, as described with reference to FIG. 7. Similarly, if an extension is provided for an immediate operand, then that extension is used, as described with reference to FIGS. 8A-8C.

Thereafter, the special purpose register is reset (e.g., set to 0 to indicate it is not available), STEP 1118, and processing continues with INQUIRY 1114.

Figure 12:
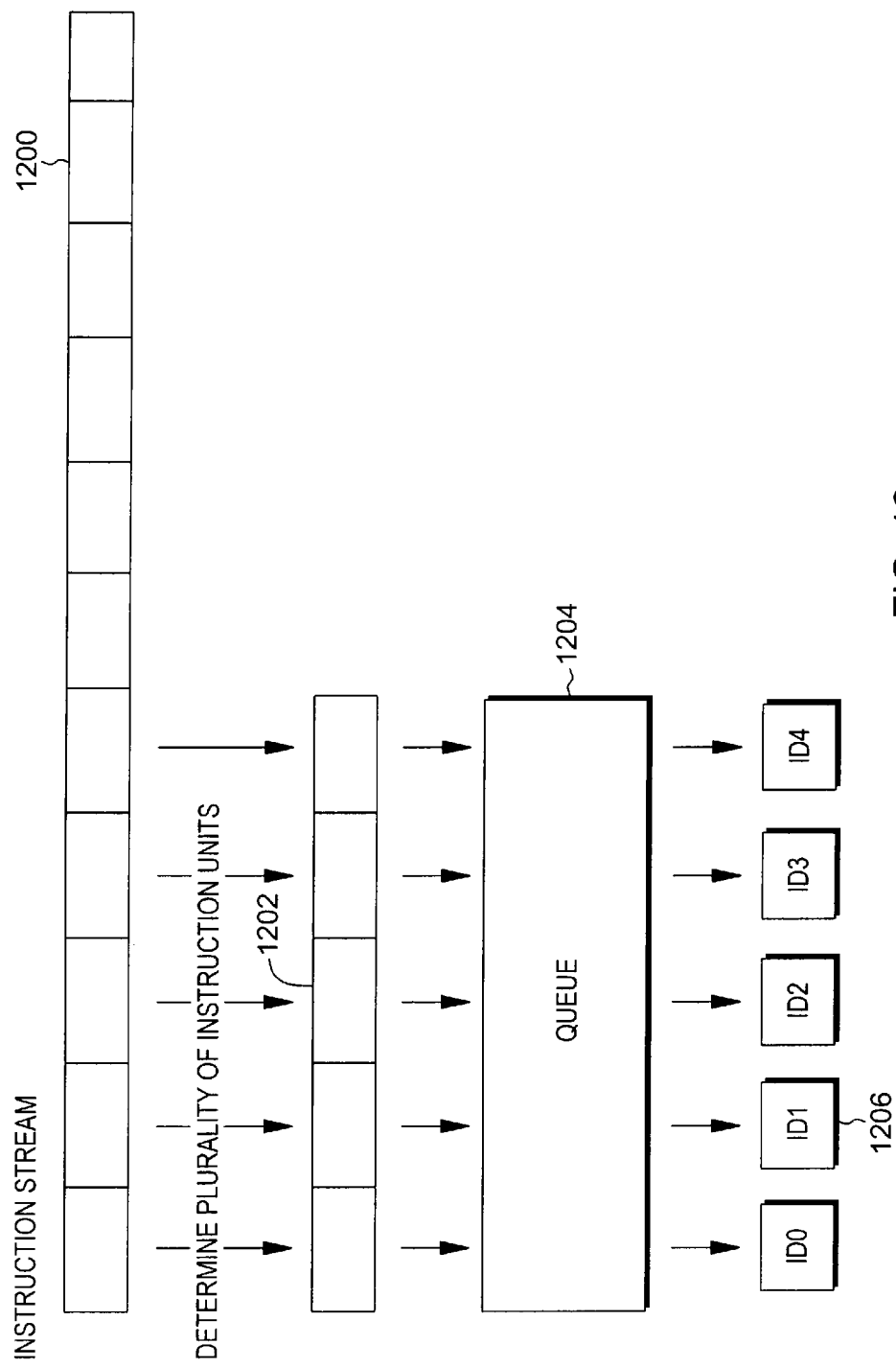
FIG. 12 depicts one example of a plurality of instruction decode units receiving a plurality of instruction units, in accordance with one or more aspects of the present invention.

Further details of one example of processing associated with decoding application code that includes prefixes are described with reference to FIG. 12. As shown, an instruction stream 1200 includes a plurality of instruction units 1202. For the Power Architecture, each instruction unit is 4 bytes, and therefore, each instruction unit is the same size. However, in other examples, such as the z/Architecture, the size of the instruction unit is determined by one or more bytes of the instruction. In this particular example, five instruction units are processed in parallel, but in other embodiments, there may be more or less instruction units being processed in parallel. The instruction units are placed in a queue 1204 and then passed to instruction decode units 1206 (ID; e.g., ID0-ID4); also referred to herein as decoders or decoder units. Each instruction decode unit decodes its instruction unit.

Figure 13:
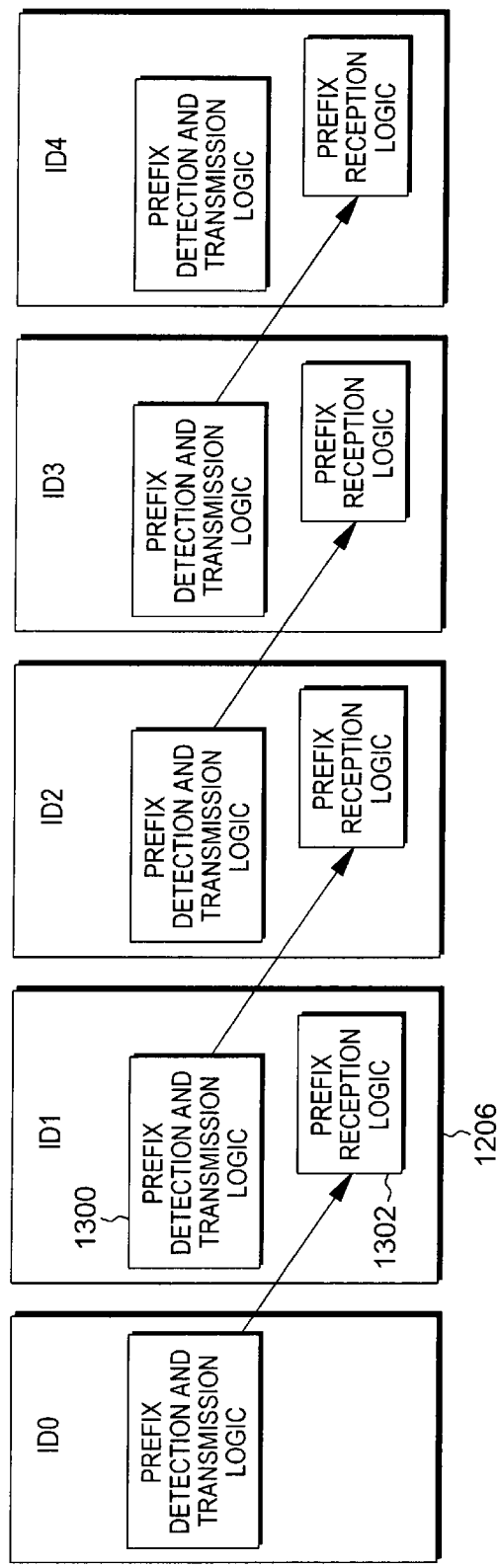
FIG. 13 depicts further details of the instruction decode units of FIG. 12, in accordance with one or more aspects of the present invention.

Further details of an instruction decode unit are described with reference to FIG. 13. In one example, each decoder includes prefix detection and transmission logic 1300 and prefix reception logic 1302, as well as other logic.

Prefix detection and transmission logic 1300 detects if the instruction received by the decoder is a prefix instruction, and if it is, it is forwarded to prefix reception logic 1302 of a neighboring instruction unit decoder 1206. For instance, prefix detection and transmission logic 1300 checks the opcode of the instruction and determines that it is a prefix instruction. It then forwards the instruction (or portions thereof) to the next instruction decode unit in succession. As an example, if prefix detection and transmission logic 1300 of ID0 detects that the instruction is a prefix instruction, then it forwards the instruction to ID1. Reception logic 1302 of ID1 receives the prefix instruction, which is to be used with the instruction received at ID1 by prefix detection and transmission logic 1300 of ID1. The prefix instruction and the instruction to be modified by the prefix instruction (i.e., the prefixed instruction) are decoded together.

In one embodiment, a determination of the presence of a prefix may be made by a single instruction decode unit to which the prefix is assigned, thereby initiating the combining of the prefix and the prefixed instruction.

Figure 14:
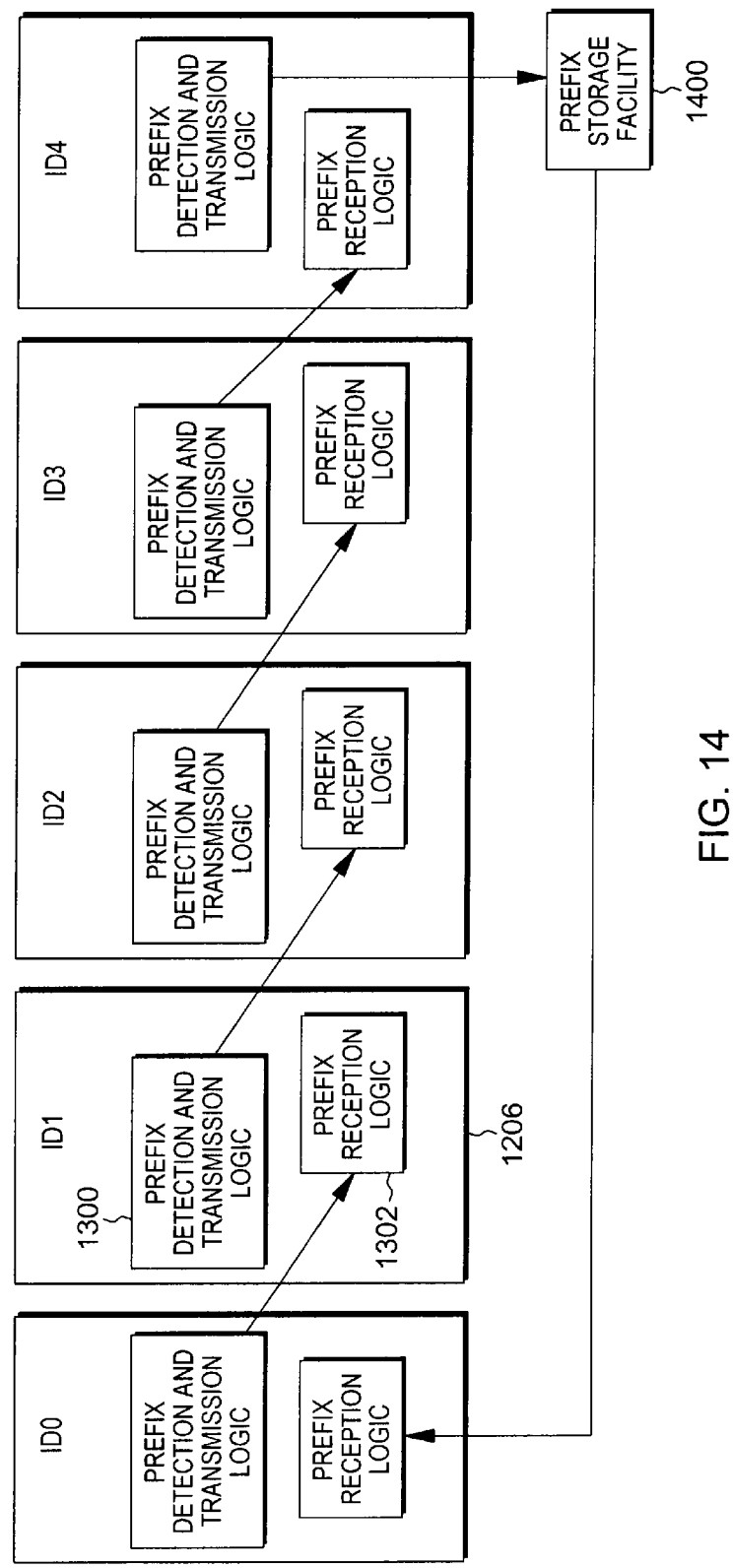
FIG. 14 depicts one example of a prefix storage facility used in accordance with one or more aspects of the present invention.

In a further embodiment, referring to FIG. 14, a prefix storage facility 1400 is provided in the event that the last decoder unit in the group of decoder units includes the prefix instruction. This is to accommodate the fact that the last decoder has no "next" decoder in which to forward the prefix instruction. The prefix instruction is saved in prefix storage facility 1400, and then forwarded to the first decoder (ID0) of the next group of instruction units to be decoded. Therefore, the prefix instruction is united with the instruction to be prefixed, and they are decoded together. In one embodiment in which there are multithreaded processors, i.e., processors with hardware multithreading or simultaneous multithreading, multiple prefix storage facilities 700 may be present, one for each thread.

In one embodiment, the prefix is universal and may be applied to multiple instructions. For example, by defining a universal prefix applicable to a large number of instructions, the need for decode logic that would otherwise be necessary to determine how to apply the prefix to the next instruction is eliminated. Instead, the prefix simply loads SPRd and applies SPRd the same way to all D-form instructions, thereby eliminating the need for extensive logic.

Similarly, the universal prefix can be applied to x-form instructions, i.e., instructions with an indexed addressing mode computing the address as the sum of a base and an index register, e.g., RS1+RS2, RA+RB, or RB+RX, in a uniform manner to provide pc-relative addressing as well, effectively extending the capability of all x-form instructions with the use of a single prefix. Thus, enabling addressing of operands with IA+RS2, IA+RB, or IA+RX, respectively. In yet other embodiments, other existing and future undefined addressing modes may be similarly modified by overriding operands.

The universal prefix can override operands outright with the instruction address functionality, and may cause the instruction-specified register to be completely ignored, simultaneously extending the immediate field.

Also, because SPRd is set to 0 after the next instruction is executed, it is determined if a prefix has been erroneously inserted before an instruction that does not use prefixes. That is, if code erroneously inserts a prefix before a "non-prefixable' instruction, SPRd is non-zero at execution of the instruction, and hardware can easily recognize this coding error and cause an interrupt.

Figure 15:
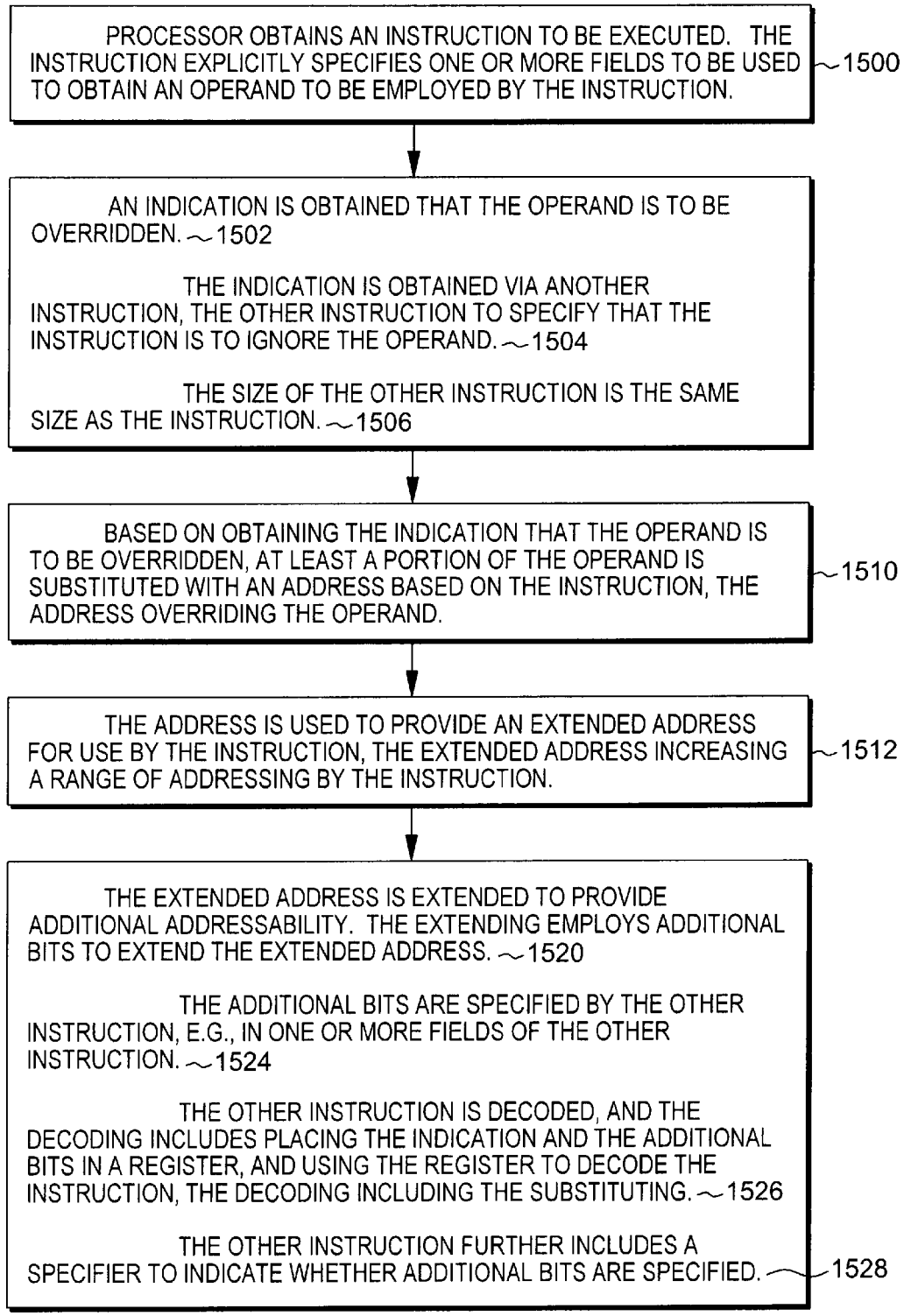
FIG. 15 depicts one example of processing associated with extending addressability, in accordance with an aspect of the present invention.

As described herein, in one embodiment, referring to FIG. 15, a processor obtains an instruction to be executed, STEP 1500. The instruction explicitly specifies one or more fields to be used to obtain an operand to be employed by the instruction. An indication is obtained that the operand is to be overridden, STEP 1502. As an example, the indication is obtained via another instruction, the other instruction to specify that the instruction is to ignore the operand, STEP 1504. In one particular example, the size of the other instruction is the same size as the instruction, STEP 1506.

Based on obtaining the indication that the operand is to be overridden, at least a portion of the operand is substituted with an address based on the instruction, the address overriding the operand, STEP 1510. The address is used to provide an extended address for use by the instruction, the extended address increasing a range of addressing by the instruction, STEP 1512.

In a further embodiment, the extended address is extended to provide additional addressability, the extending employing additional bits to extend the extended address, STEP 1520. As an example, the other instruction further specifies the additional bits, STEP 1524. For instance, the other instruction includes one or more fields to specify the additional bits, STEP 1524.

In one embodiment, the other instruction is decoded, and the decoding includes placing the indication and the additional bits in the register, and using the register to decode the instruction, the decoding including the substituting, STEP 1526.

Additionally, in one embodiment, the other instruction includes a specifier to indicate whether additional bits are specified, STEP 1528.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 16:
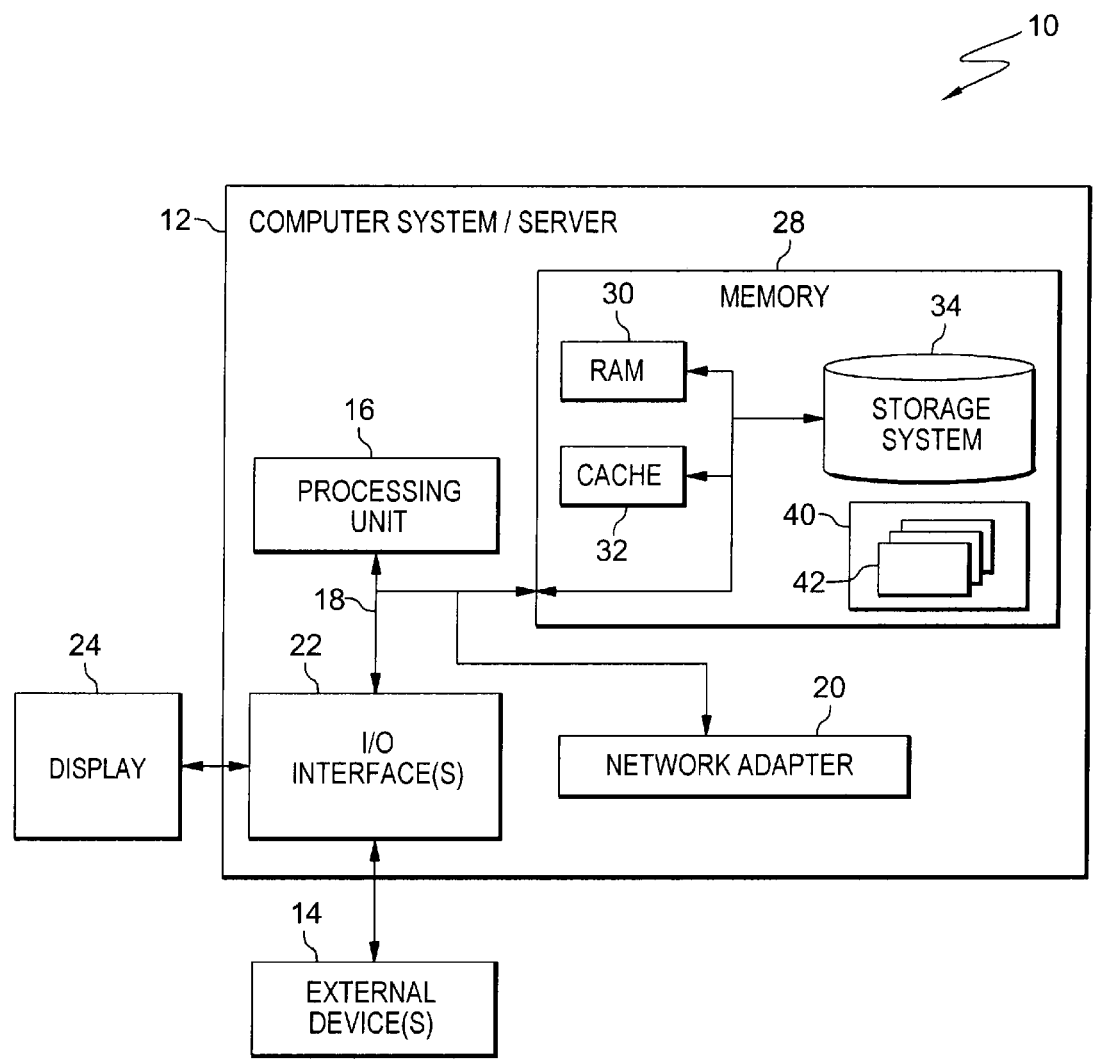
FIG. 16 depicts one embodiment of a cloud computing node.

Referring now to FIG. 16, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 17:
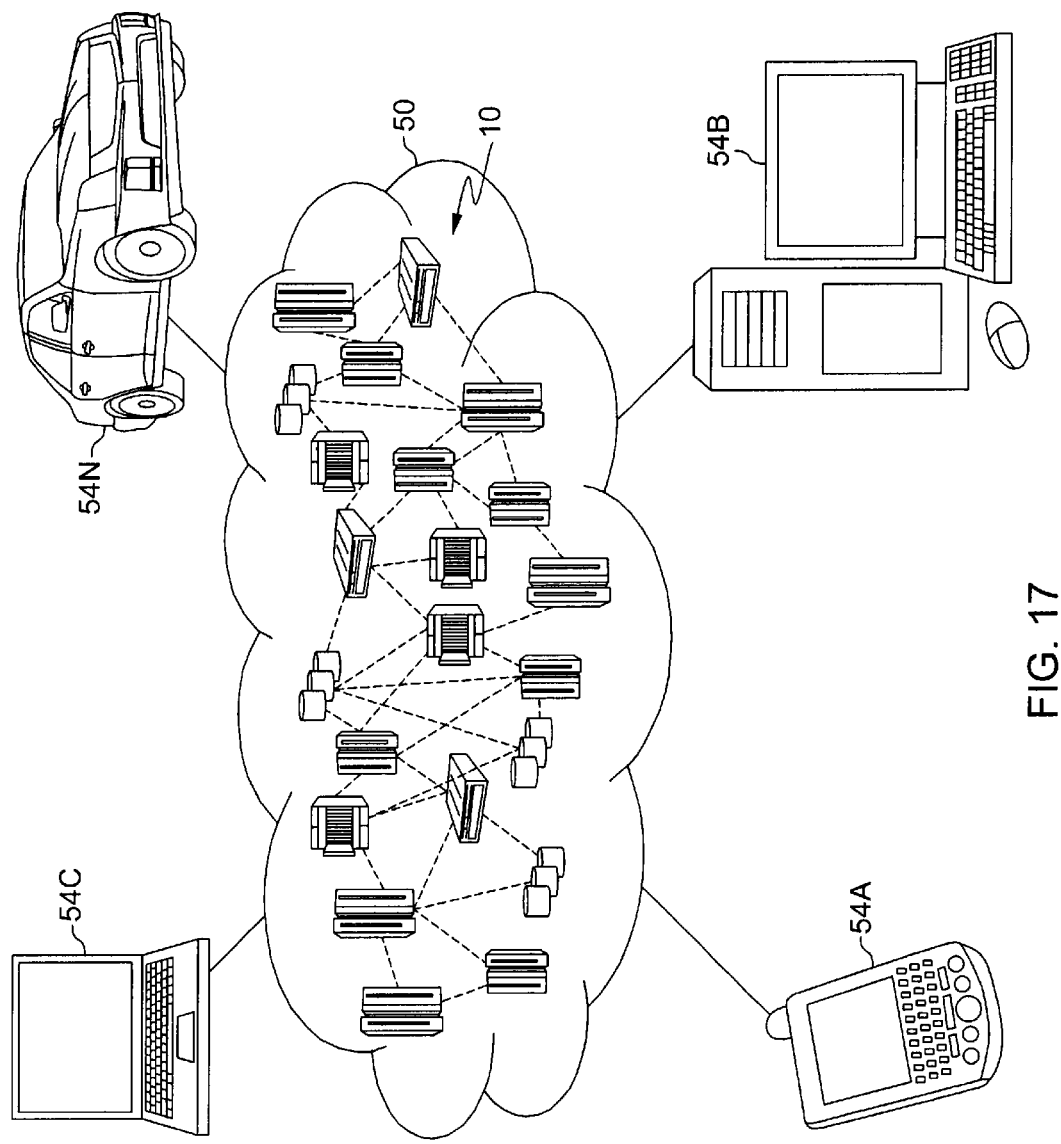
FIG. 17 depicts one embodiment of a cloud computing environment.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
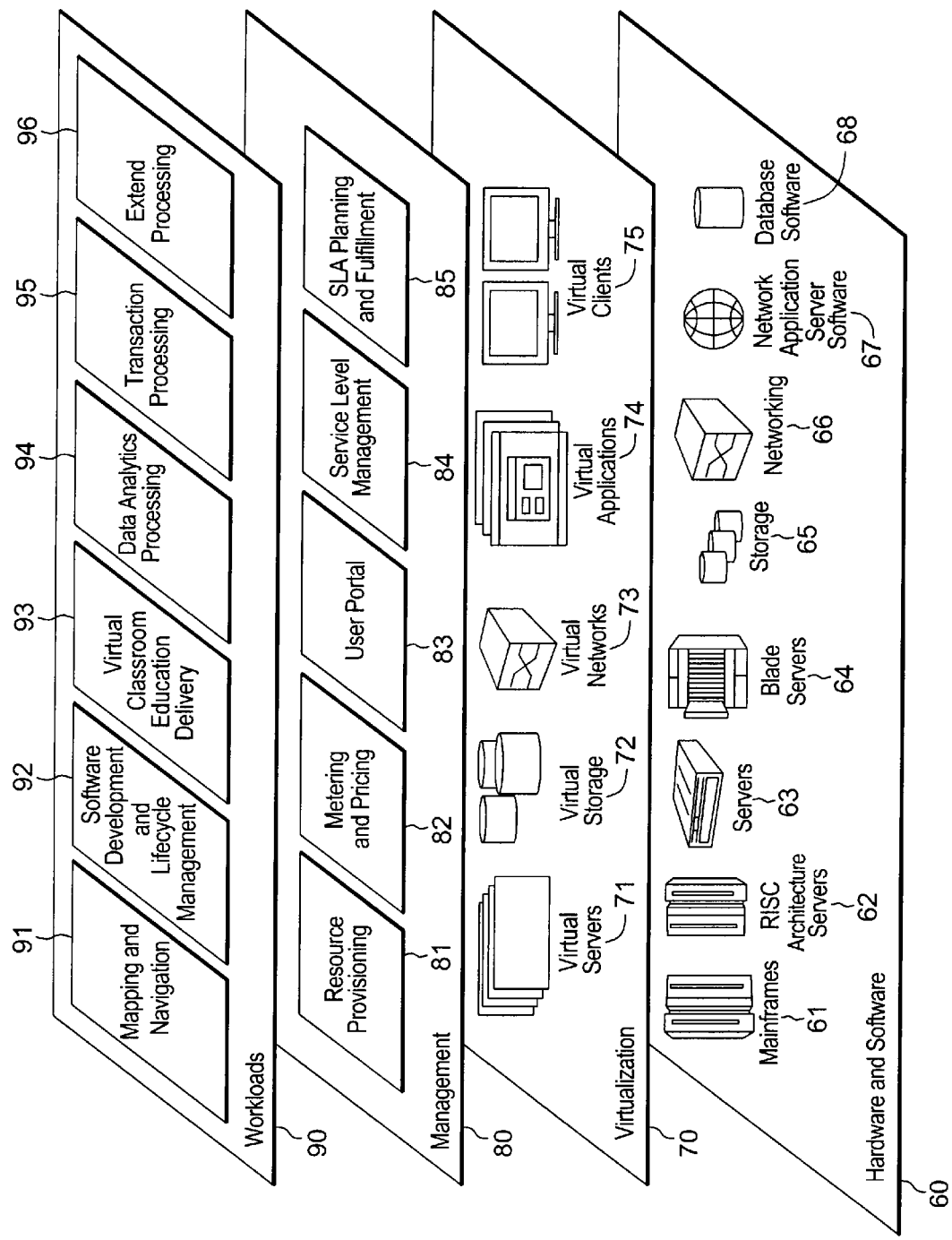
FIG. 18 depicts one example of abstraction model layers.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and extension processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Additionally, the prefix may be specified in other ways and/or other types of prefixes may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing in a computing environment, the computer-implemented method comprising:
    obtaining, by a processor, an instruction to be executed, the instruction explicitly specifying one or more fields to be used to obtain an operand to be employed by the instruction;
    determining whether the instruction has a corresponding prefix instruction, the prefix instruction being another instruction from the instruction to be executed obtained by the processor;
    based on determining that the instruction does not have the corresponding prefix instruction, obtaining, from a current instruction address of the instruction, an indication that the operand is to be ignored, the indication being one indicator of multiple indicators to be used in overriding the operand, the current instruction address including a selected address to be used to override the operand;
    based on determining that the instruction has the corresponding prefix instruction, initiating a decoding of the instruction, the initiating determining whether the decoding of the instruction supports prefixing;
    based on determining that the decoding of the instruction supports prefixing, determining whether a prefix of the prefix instruction includes the indication that the operand is to be ignored, the indication being one indicator of the multiple indicators to be used in overriding the operand and the prefix indicating the selected address to be used to override the operand;
    based on obtaining the indication that the operand is to be ignored, replacing the operand with the selected address based on the instruction;
    determining, via a specifier, whether an additional value is to be employed with the selected address, the specifier being another indicator of the multiple indicators;
    modifying the selected address using the additional value, based on the specifier indicating the additional value is to be employed with the selected address; and
    using the selected address to provide an extended address used by the instruction in addressing a table with an extended directly addressable data range, the extended address increasing a range of addressing by the instruction into the table.

2. The computer-implemented method of claim 1, wherein the additional value includes one or more additional bits to extend the selected address, providing the extended address.

3. The computer-implemented method of claim 2, wherein the prefix instruction further specifies the one or more additional bits.

4. The computer-implemented method of claim 3, wherein the prefix instruction comprises one or more fields to specify the one or more additional bits.

5. The computer-implemented method of claim 3, wherein the method further comprises:
    decoding the prefix instruction, the decoding comprising placing the indication and the one or more additional bits in a register; and
    using the register during the decoding of the instruction, where the decoding of the instruction includes the replacing of the operand with the selected address.

6. The computer-implemented method of claim 2, wherein the prefix instruction further comprises the specifier to indicate whether the one or more additional bits are to be employed.

7. The computer-implemented method of claim 1, wherein a size of the prefix instruction is a same size as a size of the instruction.

8. The computer-implemented method of claim 1, wherein the instruction is a successor instruction and the prefix instruction includes an indicator indicating whether an address based on the successor instruction is to be used as a base address for the successor instruction.

9. The computer-implemented method of claim 8, wherein the prefix instruction further includes a field including a value to be used to override selected bits of at least one operand of the successor instruction.

10. The computer-implemented method of claim 1, wherein, based on the determining the decoding does not support prefixing, generating an error to be presented.

* * * * *